United States Patent [19]

Eddens

[11] 4,130,014

[45] Dec. 19, 1978

[54] TENSION MONITOR MEANS

[75] Inventor: Gerald R. Eddens, St. Louis, Mo.

[73] Assignee: W. J. Industries, Incorporated, St. Louis, Mo.

[21] Appl. No.: 840,646

[22] Filed: Oct. 11, 1977

[51] Int. Cl.² ............................................. G01L 5/10
[52] U.S. Cl. ..................................................... 73/144
[58] Field of Search ........................... 73/144, 159, 105

[56] References Cited

U.S. PATENT DOCUMENTS

| 3,260,106 | 7/1966 | Hull et al. | 73/144 |
| 3,763,701 | 10/1973 | Wright et al. | 73/144 |
| 4,052,891 | 10/1977 | Bartlett | 73/144 |

Primary Examiner—Anthony V. Ciarlante
Attorney, Agent, or Firm—Charles B. Haverstock

[57] ABSTRACT

An apparatus for measuring and monitoring the tension on a web or strand as it extends and/or moves over and around a roll including a support assembly for supporting at least one end of the roll, said support assembly including a bridge structure having spaced connected bridge portions aligned with the roll on opposite sides of the axis thereof, a mounting member attached to anchor one end of the bridge structure in fixed position, a diaphragm member attached to the opposite end of the bridge structure, a mounting structure for attaching the diaphragm member to the roll, at least two and preferably four strain sensitive gage members attached to one of said spaced connected bridge portions, and a bridge type electric circuit including circuit connections to said strain sensitive gage members. The present apparatus may have a similar support assembly and associated components operatively connected to both opposite ends of the roll, each of the assemblies including a housing for around a bridge structure and a diaphragm member.

20 Claims, 12 Drawing Figures

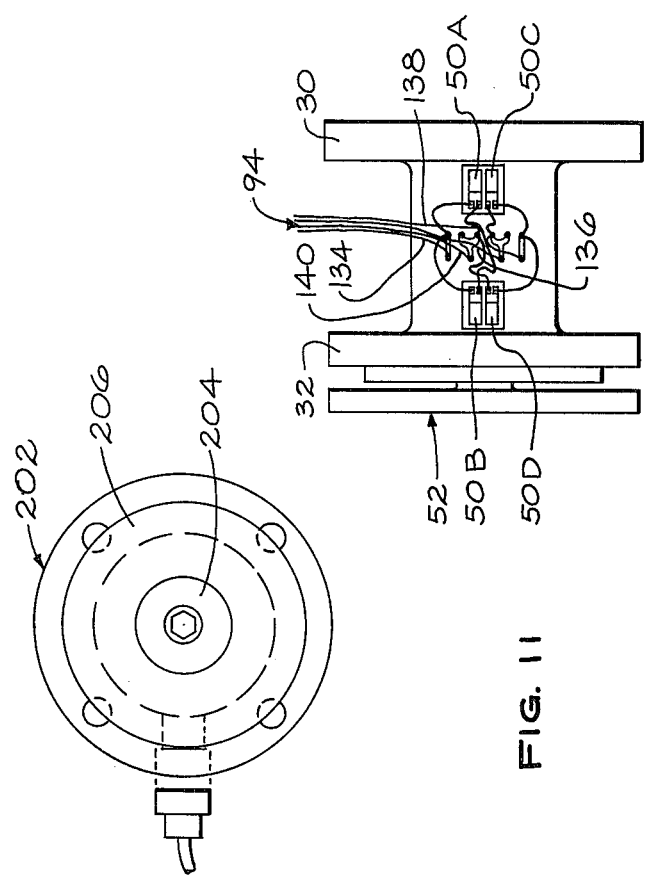
FIG. 12
FIG. 11
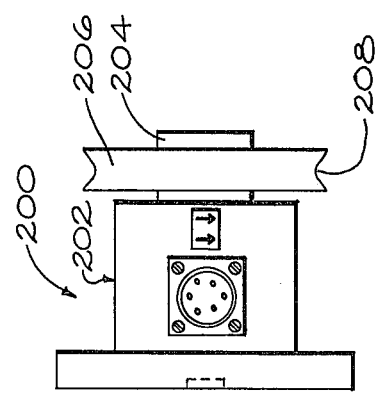
FIG. 10

TENSION MONITOR MEANS

Many strain measuring devices are in existence and are used for various purposes including measuring and monitoring the strain forces such as tension and compression forces on webs and strands of materials as they are fed over, around and between feed rolls for various purposes. In many processes where webs and strands are fed, it is important to know the tension on the web or strand for a variety or reasons, including to maintain uniformity of the web product, to avoid breakage, to avoid undue stress, to compensate for varying forces as the web or strand is wound and unwound from a spool or other device by compensating for changes in the diameter of the spool as the web or strand is wound and unwound thereon, and for other reasons. Being able to measure and monitor these forces during feeding of the web or strand is a valuable aid in making adjustments to compensate for changes in the tension forces, especially during movements of the web or strand.

The closest known prior art device to the present device is disclosed in Hull et al. U.S. Pat. No. 3,260,106 which issued July 12, 1966. The device disclosed in the Hull et al. patent, however, has certain disadvantages and shortcomings that are not present in the subject device. For one thing, the bridge member in the Hull et al. device has but one reduced cross-section strain portion at each opposite end of the roll, and these portions in the Hull et al. device are located on the axis of the feed roll and their cross-sectional size is smaller than the cross-sectional size of the rest of the roll structure. The strain sensitive portion of the Hull et al. device also has an annular diaphragm that is sweat fitted or welded onto a mounting ring and mounted on an extension on one end of each of the strain members. When so mounted the outer peripheral portion of the diaphragm in the Hull et al. device is clamped between two ring members that are mounted in a cavity in the fixed structure that supports the shaft on which the roll is mounted. In the Hull et al. type construction the spacing between the mounting assembly and the surrounding fixed housing structure is substantially greater than the spacing between the strain or bridge member on which the strain gages are located and the surrounding structure so that when the strain member has deflected enough to abut the adjacent housing surface any additional overload force on the roll is applied on and borne by the diaphragm member, and this makes the diaphragm member of the Hull et al. device vulnerable to excessive strain and to damage. This is highly undersirable in a device wherein the diaphragm is extremely important to the operation. The same is not true of the present device which in one embodiment also has a diaphragm but wherein the diaphragm moves into engagement with the surrounding fixed structure before the strain member can, and this prevents excessive overloading and possible damage to the diaphragm. Also, in the form of the present construction that has a diaphragm, the diaphragm is of one-piece construction which includes a central hub portion for attaching to the strain member, a peripheral rim portion for attaching to the roll structure and an annular diaphragm portion integral with and extending between the hub and rim portions. The hub portion when installed extends into a cavity formed in one of the end wall portions of the strain member rather than being installed on an extension thereof as in Hull et al., and the peripheral portion of the diaphragm of the present device abuts the end surface of the roll shaft mounting structure, but is not located in a cavity therein. This makes for better, more uniform operation of the diaphragm. Furthermore, the fact that the outer peripheral portion of the present diaphragm is not mounted in a cavity as is the Hull et al. device means that the diaphragm can be more easily and more accurately installed and can be made to extend to a relatively closely spaced, accurately predetermined relation to the adjacent surface of the wall of the housing member. Also, because the diaphragm of the present construction, including the hub and rim portions, is of one piece construction it is much easier to accurately install and does not rely on field assembly and alignment. These features of the diaphragm portion of the subject device are important to the present device because they provide better overload protection and simpler construction, assembly, and installation. In addition to these structural differences between the present device and the Hull et al. type device, the dual spaced beam construction of the strain member employed in the present device provides better roll support, better deflection characteristics of the strain member, and enables use of thinner bridge members thereby providing more sensitive response characteristics. The dual beam construction also causes the end portions of the subject bridge member to move parallel to each other under load, which is not true when a single bridge member is used, due to the parallelogram construction of the bridge, while a construction such as Hull et al. which has a single bridge member will produce arcuate movement of one end relative to the other when deflected. Also, with the present device the total amount of possible diaphragm deflection can be very accurately controlled, and the diaphragm member can be constructed to have a slightly larger overall cross-section or diameter in relation to the size of the adjacent portion of the bridge member, thus substantially simplifying the construction and operation of the present device as compared to the Hull et al. device. In fact, the diameter of the diaphragm in the preferred form of the present device is slightly larger than that of the adjacent end of the bridge member and it, not the bridge member, engages the housing surface to limit its movement under load. The present twin beam construction also better lends itself to use in supporting a roll that has only one of its ends supported and around which a strand, as distinguished from a web, whose tension is to be mounted, passes.

Other prior art devices that have been considered and are of some general interest to show the state of the art are disclosed in U.S. Pat. Nos. 3,444,731, 3,495,454, 3,512,406 and 3,763,701.

It is therefore a principal object of the present invention to teach the construction and operation of improved means for measuring and monitoring the tension on a web or strand as it extends against or around a roll such as a feed roll.

Another object is to teach the construction of an improved bridge structure for use in strain measuring devices.

Another object is to teach the construction and operation of a dual beam bridge member for use in web tension measuring devices.

Another object is to teach the construction and installation of an improved roll support diaphragm for use in a tension measuring device.

Another object is to provide a tension measuring device that is relatively less susceptible to breakage and loss of adjustment.

Another object is to make the location and size of the coupling means employed in tension sensing devices relatively less critical.

Another object is to cancel out the effects of twisting and other movements and moments produced due to misalignment in a tension sensing device.

Another object is to make possible a reduction in the number of parts needed in a tension sensing device.

Another object is to provide a tension sensor that is relatively insensitive to temperature changes.

Another object is to provide a tension sensing device that can be made using one or two bridge devices and associated strain gage members.

Another object is to provide a tension measuring device for sensing the tension in a web or strand of material, which device lends itself to being made to cover different ranges of tension.

Another object is to provide improved diaphragm overload protection for a web tension measuring device.

These and other objects and advantages of the present device will become apparent after considering the following detailed specification in conjunction with the accompanying drawings wherein:

FIG. 10 is a side elevational view of another embodiment of the subject device especially adapted to sense the tension on a strand of material;

FIG. 11 is a right end view of the embodiment of FIG. 10; and,

FIG. 12 is a top plan view of the sensor member per se showing the location of the strain gages thereon.

Figure 1:
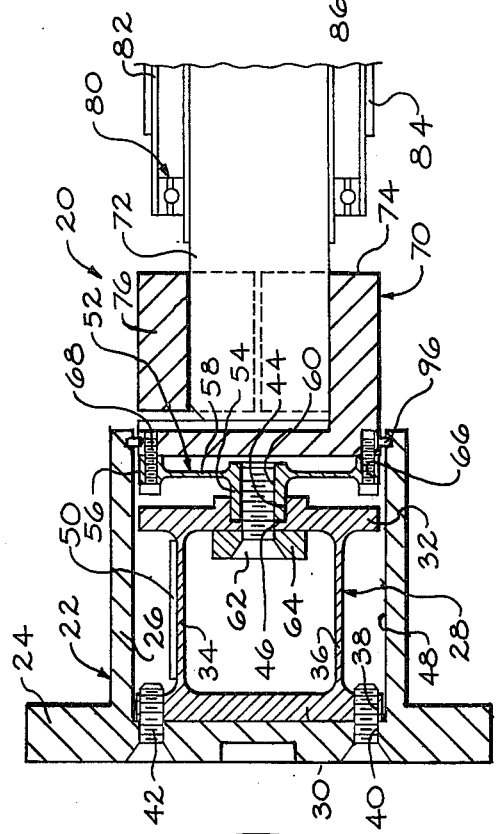
FIG. 1 is a fragmentary cross-sectional view through the center of a web tension measuring and monitoring device constructed according to one embodiment of the present invention.

Referring to the drawings more particularly by reference numbers, number 20 in FIG. 1 identifies a tension sensing assembly constructed according to one embodiment of the present invention. The assembly 20 includes a flanged housing 22 with a mounting flange portion 24 having holes 25 for receiving threaded members used for attaching it to a fixed support structure. The housing 22 also has a closed tubular wall portion 26 shown as being round for illustrative purposes.

A dual beam sensing member 28 is positioned in the housing 22. The construction and operation of the sensing member 28 are important to the invention for reasons which will be explained. The member 28 has spaced end wall portions 30 and 32 which are integrally connected by spaced beam portions 34 and 36. The beam portions 34 and 36 are relatively thin in cross-section, as shown, and are preferably positioned on opposite sides of the axis of the device and are oriented to be normal or nearly normal to the direction of principal strain. The end wall 30 of the member 28 has a plurality of threaded holes 38 therethrough which are aligned respectively with holes 40 in the end wall 24 of the housing 22, and bolts 42 extend through the holes 40 and are threadedly engaged with the holes 38 to fixedly attach the sensing bridge member 28 to the housing. The opposite end wall 32 of the member 28 is shown as also being round for illustrative purposes and has a round recess or cavity 44 formed in it in communication with a center hole 46. The wall 32 extends outwardly to adjacent to, but not in contact with, inner surface 48 of the housing portion 26.

Figure 5:
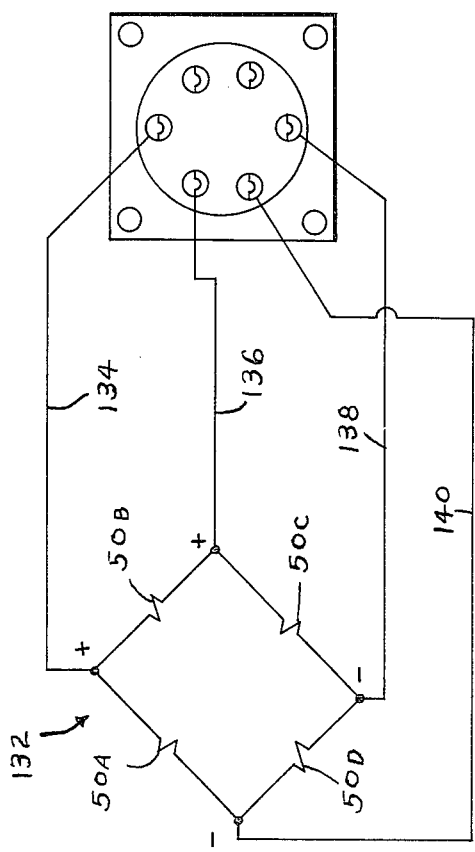
FIG. 5 is a simplified circuit diagram showing the electrical connections to the strain gages or sensors employed in the present device.

One of the beams 34 (or 36) of the bridge member 28 has foil type sensor elements or strain gages 50 attached thereto and provision for four such elements is shown, two of the elements being positioned to respond mainly to the tension forces on the beam member 34 and two to the compression forces. The sensors 50 are further identified in FIGS. 9 and 12 by the letters A, B, C and D. The sensor elements 50 may be of known construction and are adhesively attached to the bridge structure. They also have electrical connections made to them (FIG. 12) and these connections are brought out through openings in the device and are connected to electric circuits (FIG. 9) which are used in conjunction with the subject device to provide an indication of tension as will be described more fully in connection with FIGS. 5 and 9.

Figure 3:
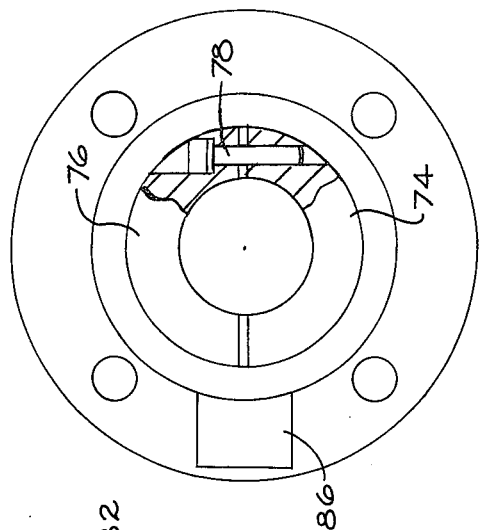
FIG. 3 is a right end view of the device of FIG. 1.

The assembly 20 also includes a diaphragm member 52 which has hub and rim portions 54 and 56 connected integrally to opposite inner and outer edges of an annular diaphragm portion 58. The hub portion 54 is constructed to be positioned in the cavity 44 in the bridge end wall 32, and the hub portion 54 has a threaded passage 60 therethrough. A threaded member 62 extends through a washer member 64, through the hole 46 and into cooperative engagement with the threaded passage 60 to hold the diaphragm member 52 in the position shown. The rim portion 56 of the diaphragm 52 has a plurality of spaced holes 66 therethrough which receive respective threaded members 68 that cooperate with threaded holes in a shaft mounting assembly 70 constructed to engage and support one end of shaft 72. The assembly 70 is formed by first and second portions 74 and 76 which are held clamped together on the end portion of shaft 72 by a plurality of threaded members such as the threaded member 78 (FIG. 3).

Figure 6:
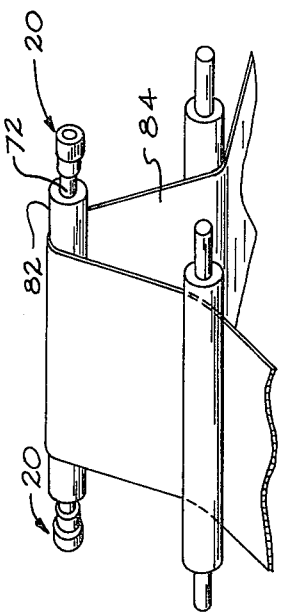
FIG. 6 is a fragmentary perspective view of a roll over which a web extends, said roll being provided with web tension sensing means constructed according to the present invention.

The opposite end of the shaft 72 engages and is supported by an assembly similar to the assembly 20, and one or both of the assemblies 20 may include members such as the bridge member 28, the diaphragm 52 and the shaft mounting assembly 70. The shaft 72 in the construction of FIG. 1 is fixed and non-rotatable but carries spaced bearing assemblies 80 which rotatably support a roller member 82 which is the member over which a web, a strand or some other member 84 whose tension is to be measured extends as best shown in FIG. 6.

Figure 4:
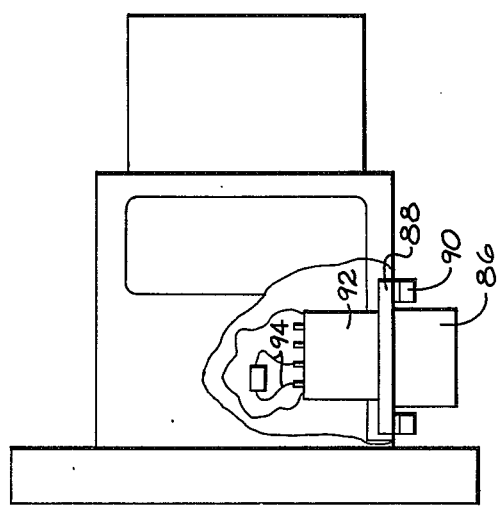
FIG. 4 is a top plan view, partly cut away, of the device of FIG. 1.
Figure 2:
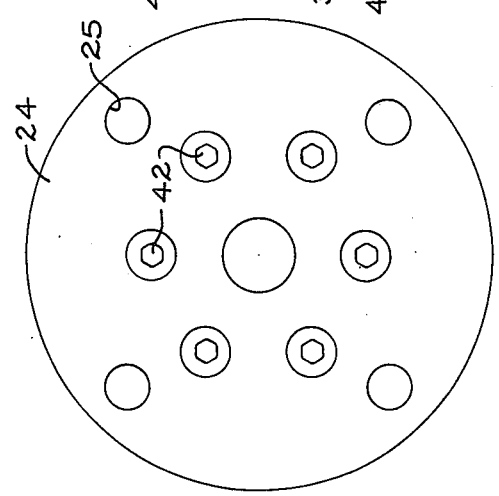
FIG. 2 is a left end view of the device of FIG. 1.
Figure 9:
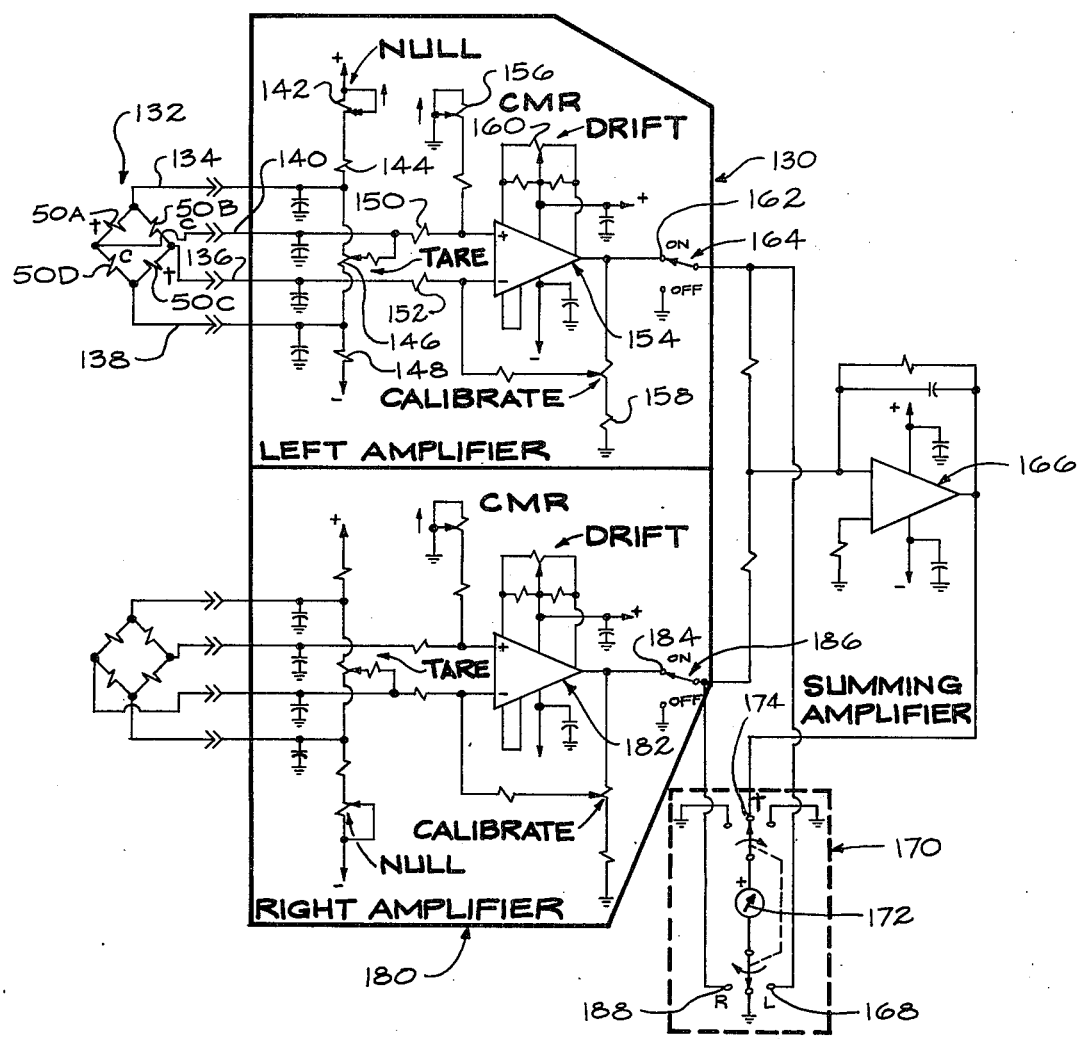
FIG. 9 is a schematic view of a circuit diagram for use with the subject tension sensing means.

Mounted on the side of the housing member 26 (FIGS. 3 and 4) is a connection assembly 86 which includes a mounting flange 88 with locations for threaded members 90 used for attaching it. The assembly 86 is shown having a portion 92 located inside of the housing 22 with means for attaching leads 94 which have their opposite ends connected to the strain gages 50 A, B, C and D (See FIG. 12). The strain gages are connected into an electric bridge circuit by means such as shown in FIG. 9, one such bridge circuit being provided by the strain gages located in the assembly 20 at each opposite end of the shaft 72. Various other ways to take out the leads 94 from the assembly 20 will be described in connection with the other embodiments. It is also contemplated to use two or four strain gages in each assembly 20, the advantage of four being greater output and hence more sensitivity.

Referring again to FIG. 1 the outer rim portion 56 of the diaphragm member 52 is shown spaced slightly inwardly from the adjacent inner housing surface 48, and a flexible dust seal 96 is mounted in a groove provided therefor in the housing portion 26 to make sealed engagement between the outer surface of the shaft mounting assembly 70 and the housing portion 26. The clearance provided between the diaphragm rim 56 and the housing surface 48 is less than the spacing between the outer surface of the unattached end portion 32 of the bridge member 28 and the housing surface 48. This is fairly easy to accurately control since the diameter of the diaphragm 52 can easily be made to be greater than the diameter of the end portion 32. This fact provides overload protection for the bridge member 28 by regulating the amount that the diaphragm can move under load to the same amount that the portion 32 can move, but the diaphragm 52 movement controls the total possible movement, not the portion 32. This is to be distinguished from other devices including the device disclosed in the Hull et al. patent discussed above wherein the diaphragm can move much further even after the bridge member has moved against the adjacent wall. This is an important difference between the devices and is one of the main reasons why the diaphragm and the bridge member in the present construction are less apt to be damaged by excessive force on the roll due to excessive web tension or due to other loading on the roll due to a jam or for some other reason.

Figure 7:
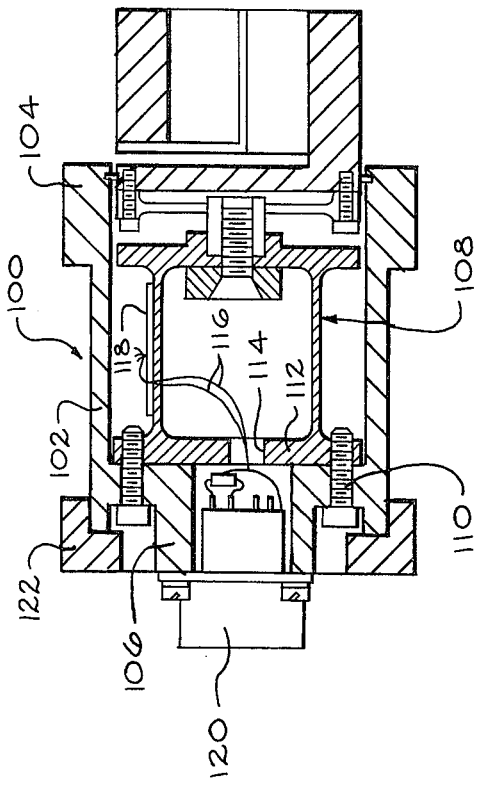
FIG. 7 is a cross-sectional view showing another embodiment of the subject tension sensing means.
Figure 8:
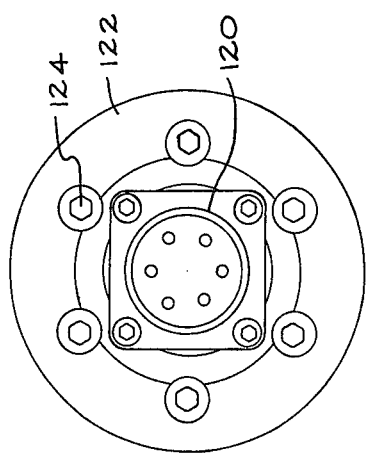
FIG. 8 is a left end view of the embodiment shown in FIG. 7.

The construction shown in FIGS. 7 and 8 is similar to the construction shown in FIGS. 1-4 but differs therefrom mainly in the means used for mounting the device. For example, the device of FIGS. 7 and 8 has a two-piece housing 100 instead of the one-piece housing 22 of the construction shown in FIGS. 1-4. The two-piece housing 100 includes a tubular portion 102 with an outwardly extending annular flange 104 located at the end where the shaft is attached and a smaller diameter endward extension portion 106 located at the opposite end. In this construction bridge member 108 (which is similar to bridge member 28) is fixedly connected to the housing by threaded members 110, and end wall 112 of the bridge member 108 has a hole 114 through it which accommodates leads 116 that are connected to the strain gages 118. A connector assembly 120 is attached to the end of the tubular portion 106 of the housing member 102, and the housing 100 also includes another housing member 122 which is attached to the housing member 102 by other threaded members 124 (FIG. 8). Except for these differences and for the further reason that the housing structure 100 is adapted to be mounted in a pillow block (not shown) instead of being bolted to a fixed wall, the assembly of FIGS. 7 and 8 is structurally and operationally similar to the assembly of FIGS. 1-4.

FIG. 9 shows a typical circuit diagram for use with the present devices. The circuit as shown has separate similar circuit portions for connection to the strain gages 50 A-D in the sensor assemblies located at both opposite ends of the roll. For convenience the circuit portion which applies to the assembly at one end of the roll is referred to as the LEFT circuit portion and the circuit portion associated with the assembly at the other end of the roll is referred to as the RIGHT circuit portion. Both the LEFT and RIGHT circuit portions are similar in construction and operation and only one of the portions will be described in detail.

The LEFT circuit portion 130 has input connections to bridge circuit 132 which is formed by the strain gages 50A, 50B, 50C and 50D. The strain gages 50A and 50C are the tension gages and produce responses representative of the tension forces on the bridge member 34. The tension strain gages are located near the fixed end of the upper bridge member 34 and the compression strain gages are located on the member 34 near the cantilevered or unattached end 32 of the bridge member 28. The strain gages 50A and 50C are connected as one pair of opposite legs of the bridge circuit 132 and are further labeled T to indicate tension. The strain gages 50B and 50D are labeled C for compression and form the other pair of opposed legs of the input bridge circuit 132. The circuit 132 as well as the individual strain gages which make it up are also sometimes referred to as transducers. The corners of the bridge circuit 132 between the adjacent strain gages or transducers are connected by leads 134, 136, 138 and 140 and are the inputs to the LEFT circuit portion 130. Each of these leads is connected to one side of a respective grounded capacitor, and the leads 134 and 138 are also connected to points in a voltage divider circuit which includes a connection from a positive voltage source through an adjustable NULL potentiometer 142, fixed resistor 144, adjustable TARE potentiometer 146, and another fixed resistor 148 to a negative voltage source. The potentiometers 142 and 146 are used to null and/or balance the bridge circuit 132 to establish a desired operating condition.

The outputs of the bridge 132 on leads 140 and 136 are connected through associated fixed resistors 150 and 152 to positive and negative input terminals of an amplifier circuit 154. These inputs are also adjustable to establish a desired operating condition by means of grounded potentiometers 156 labeled CMR for Common Mode Rejection and 158 labeled CALIBRATE. The CMR potentiometer 156 provides means for adjusting the amplifier 154 so that it amplifies only the difference between the inputs it receives. The amplifier 154 is suitably biased by other circuit means including by a DRIFT potentiometer 160. The output side of the amplifier 154 is connected to one side of the CALIBRATE potentiometer 158 and to ON terminal 162 of a two position switch 164. The OFF side of the switch 164 is used in a manner to be described. When the switch 164 is in its ON position its output side is connected to one input of another amplifier circuit 166 and to one terminal (the L terminal) 168 of meter 170 suitably constructed and located to provide an indication as to the tension on the web or strand being measured. The meter 170 has a pointer 172 which is calibrated to indicate tension in suitable units such as in pounds of tension. The output of the amplifier 166 is connected to the T or tension terminal 174 of the meter 170.

The RIGHT circuit portion 180 is similar in construction and operation to the LEFT circuit portion 130 but receives its inputs from the strain gages or transducers located in an assembly at the opposite end of the roll 82.

The circuit portion 180 has an amplifier circuit 182 that is similar to the amplifier circuit 154 and its output is connected to the ON terminal 184 of another two position switch 186. The output side of the switch 186 is connected to the same input of the amplifier 166 as the output side of the switch 164 so that it is summed in the amplifier 166 with the output of the LEFT circuit portion 130 for feeding to the T or tension input terminal of the meter 170. The output side of the switch 186 is also connected to the R or RIGHT meter input terminal 188. When both of the switches 164 and 186 are set in their ON positions the meter 170 will receive separate inputs from the outputs of each of the circuit portions 130 and 180 and will also receive another input from the output of the amplifier circuit 166 representing the combined outputs of both of the circuit portions 130 and 180. If either of the switches 164 or 186 are in their off positions, however, the meter 170 (and the amplifier 166) will receive inputs only from the strain gages located at one end of the roll 82. With this arrangement it is possible to substantially increase the total outputs of the strain gages and also to increase the sensitivity and accuracy of the device as compared to devices that use fewer sensors or strain gages and have different circuit constructions. If only two strain gages are used, one adjacent each end of the bridge member it will be necessary to use fixed resistors to complete the bridge circuit. As indicated, this will reduce the bridge sensitivity. It is also possible with the present device to read the total tension forces produced by the transducers located at both opposite ends of the roll as well as the tension forces produced at each end of the roll individually. In some applications this is important because it enables balancing the forces at opposite ends of the roll.

It is important to recognize that, with the present dual beam bridge construction, while the beam members deflect under load, the end walls of the bridge member move parallel to each other. It is also important to recognize that the strain gages can be attached to either opposite side of either of the bridge beam members. However, the selected side and end will determine which strain gages are those that measure tension and those that measure compression. The beams should also be oriented to be normal or nearly normal to the main direction of force for best operation.

FIGS. 10 and 11 of the drawings show a somewhat modified form of the subject device which is designed specifically to be used to measure the tension on a strand or cord of material as distinguished from a web or sheet of material. The device of FIGS. 10 and 11 employs tension sensing means similar to those described above and it is not deemed necessary to describe this construction in detail. It should be noted, however, that this construction designated 200 includes a housing 202 which is similar to the housing 22 shown in FIG. 1 and is to be mounted in a similar way. The housing 202 contains a bridge-like strain member similar to the strain member 28 and it includes a coupling assembly which takes the place of the diaphragm 52 in the previous construction. The main difference between the construction shown in FIGS. 10 and 11 and the construction shown in FIG. 1 is that in the construction shown in FIGS. 10 and 11 the coupling member need not be a diaphragm but simply a solid member constructed to engage the housing as did the diaphragm to take the load and prevent overloading of the bridge member. The coupling member may include shaft portion 204 and means for connecting it to the bridge member. No separate mounting assembly such as the assembly 70 is required. The shaft 204 carries a pulley 206 which has a circumferential annular groove 208 formed extending around the outer surface thereof. The groove 208 receives a strand of material whose tension is to be measured. With the construction shown in FIG. 10 it is not necessary to support both opposite ends of the shaft 204, as is the case with the construction shown in FIG. 1, but it is desireably in both constructions to orient the bridge member employed therewith so that the direction of expected deflection of the bridge member due to the tension on the strand or web is normal or nearly normal to the plane of the spaced beam portions. The structure shown in FIG. 10, as in the previous constructions can be made to use two or four strain gages as desired, but it is usually preferred to use four to increase the magnitude of the output responses and the sensitivity.

All forms of the device as shown have the strain gages mounted on the upper surface of the upper beam portion 34 and it is assumed that the pressure on the roll or pulley associated therewith is directed downwardly or normal to the beam portions 34 and 36. It is recognized, however, that the strain gages could also be applied to either of the opposite surfaces of either of the beam members 34 or 36 as aforesaid, and regardless of where they are applied they will indicate strain due to upward as well as downward force on the associated roll or pulley. In the case of the construction as shown in FIG. 1, if the force on the roll 82 were to be applied upwardly instead of downwardly, the affect on strain gages will be reversed, that is the strain gages closer to the fixed support will then become the compression strain gages and the strain gages closes to the roll will become the tension strain gages. The results, however, will be similarly manifested and indicated on the meter 170.

Thus there has been shown and described several embodiments of novel tension monitoring means which fulfill all of the objects and advantages sought therefor. It will be apparent to those skilled in the art, however, that many changes, modifications, variations, and other uses and applications for the subject device are possible. All such changes, modifications, variations and other uses and applications which do not depart from the spirit and scope of the invention are deemed to be covered by the invention which is limited only by the claims which follow.

What is claimed is:

1. Apparatus for measuring the tension in a continuously moving web comprising in combination, two spaced frame members, a shaft extending between the frame members and having web engaging means rotatably mounted thereon, coupling members connecting opposite ends of the shaft to the respective frame members, each of the coupling members having two spaced deflectable portions located respectively on opposite sides of the axis of the shaft, means for holding the web in engagement with the rotatably mounted means for producing a web tension load component on the shaft with web tension load components deflecting the shaft and straining the deflectable portions, and strain sensing transducing means located on at least one of the deflectable portions for conveying therefrom a signal derived from said straining and therefore representative of the tension in the web.

2. The apparatus of claim 1 wherein each of the coupling members includes spaced opposed wall members connected integrally to opposite ends of the associated deflectable portions, and means to limit movement of one of said wall members relative to the other.

3. The apparatus of claim 2 wherein each of the coupling members includes a diaphragm member having a portion connected to one of said opposed wall members and another portion connected to the shaft.

4. The apparatus of claim 1 wherein said strain sensing transducing means includes at least two strain responsive members attached at spaced locations to one of the deflectable portions, and circuit means connecting the strain responsive members into an electric circuit bridge.

5. The apparatus of claim 4 wherein four strain responsive members are attached to one surface of said deflectable portions, means connecting said strain responsive members into a Wheatstone bridge circuit, and other circuit means connected to said Wheatstone bridge circuit, said other circuit means including bridge means and means to indicate the tension on the shaft.

6. Apparatus to measure and monitor the tension on a strand comprising a frame member, a shaft extending from the frame member and having strand engaging means rotatably mounted thereon, a coupling assembly connecting one end of the shaft to the frame member, said coupling assembly having at least two deflectable portions located respectively on opposite sides of the axis of the shaft, means for holding the strand in engagement with the strand engaging means for producing a strand tension load component on the shaft with strand tension load components deflecting the shaft and straining the deflectable portions, and strain sensing transducer means located on at least one of the deflectable portions for conveying therefrom a signal derived from said straining and therefore representative of the tension on the strand.

7. The apparatus of claim 6 wherein the coupling assembly includes spaced opposed wall members connected integrally to opposite ends of the deflectable portions.

8. The apparatus of claim 7 including a housing for around the coupling assembly, means connecting one of the opposed wall members to the housing, said housing being constructed to limit movement of the other of the spaced opposed wall members relative to said one wall member.

9. The apparatus of claim 7 wherein said coupling assembly includes a coupling member having a portion connected to said other opposed wall member and another portion connected to the shaft, said housing being constructed to also limit movement of the said coupling member under load.

10. The apparatus of claim 6 wherein said strain sensing transducer means includes at least two strain responsive members attached at spaced locations to one of the deflectable portions, and circuit means connecting the strain responsive members into an electric circuit.

11. The apparatus of claim 10 wherein four strain responsive members are attached to one surface of said one deflectable portion, means connecting said strain responsive members into a Wheatstone bridge circuit, and other circuit means connected to said Wheatstone bridge circuit, said other circuit means including bridge means and means to indicate the tension on the shaft.

12. Means to measure tension forces on a member moving over and around a roll comprising
a roll rotatable about an axis,
means supporting the roll from at least one end thereof including means responsive to forces on said roll in a direction to deflect said roll, said force responsive means including
a fixed support structure and a support member having a first end portion anchored to the fixed support structure and a second end portion, said support member including a pair of spaced deflectable portions extending between and integrally connecting the first and second end portions, said deflectable portions being located on opposite sides of a line extending through the axis of roll,
a diaphragm member interposed between the second end portion of the support member and the one roll end, said diaphragm having a hub portion connected to the second end portion and a rim portion outwardly therefrom,
means connecting the rim portion to the said one roll end,
means on said fixed support structure engageable by the second end portion of said support member and by the rim portion of the diaphragm when the roll is under predetermined tension force to limit the amount of possible deflection of said support member, and
sensor means attached to at least one of said pair of deflectable portions at a location to indicate the deflection thereof.

13. The means defined in claim 12 including similar means supporting the roll at both opposite ends thereof.

14. The means defined in claim 12 wherein the fixed support structure includes an annular wall portion anchored at one end, the first and second end portions of the support member being round and being positioned inside the annular wall portion of the fixed support structure and said spaced deflectable portions being relatively flat and in spaced parallel planes.

15. The means defined in claim 14 wherein the sensor means include a pair of strain gages respectively attached to one of the deflectable portions adjacent opposite ends thereof.

16. The means defined in claim 14 wherein the sensor means include two pairs of strain gages, one pair of strain gages being attached adjacent each opposite end of one of said deflectable portions on the same surface thereof.

17. The means defined in claim 16 including means connecting the strain gages into a bridge circuit.

18. The means defined in claim 14 wherein said annular wall portion limits movement of the first end portion relative to the second end portion.

19. The means defined in claim 12 wherein the diaphragm includes a flexible portion.

20. Means to measure tension forces on a strand member moving over and around a rotatable member comprising a member rotatable about an axis,
means for supporting said rotatable member including means responsive to forces on said rotatable member in a direction angularly related to the axis thereof, said force responsive means including
a fixed support structure and a support member having a first end portion anchored to the fixed support structure and a second end portion axially spaced from the rotatable member, said support member having a pair of spaced deflectable portions extending between and integrally connecting the first and second end portions, said deflectable portions being located on opposite sides of the axis of the rotatable member, other means fixedly connected to said second end portion of the support member for connecting the support member to the rotatable member, said other means having a portion operatively connected to said rotatable member, means on the fixed support structure in position to be engageable by said other means connected to the second end portion when the rotatable member is under predetermined tension force to limit the amount of possible movement of said rotatable member and of the deflectable portions, and sensor means attached to at least one of said pair of deflectable portions at a location to respond to the deflection thereof.

* * * * *